April 10, 1934.  C. E. WOOD  1,954,031
TIRE SPREADER
Filed April 12, 1933  4 Sheets-Sheet 3
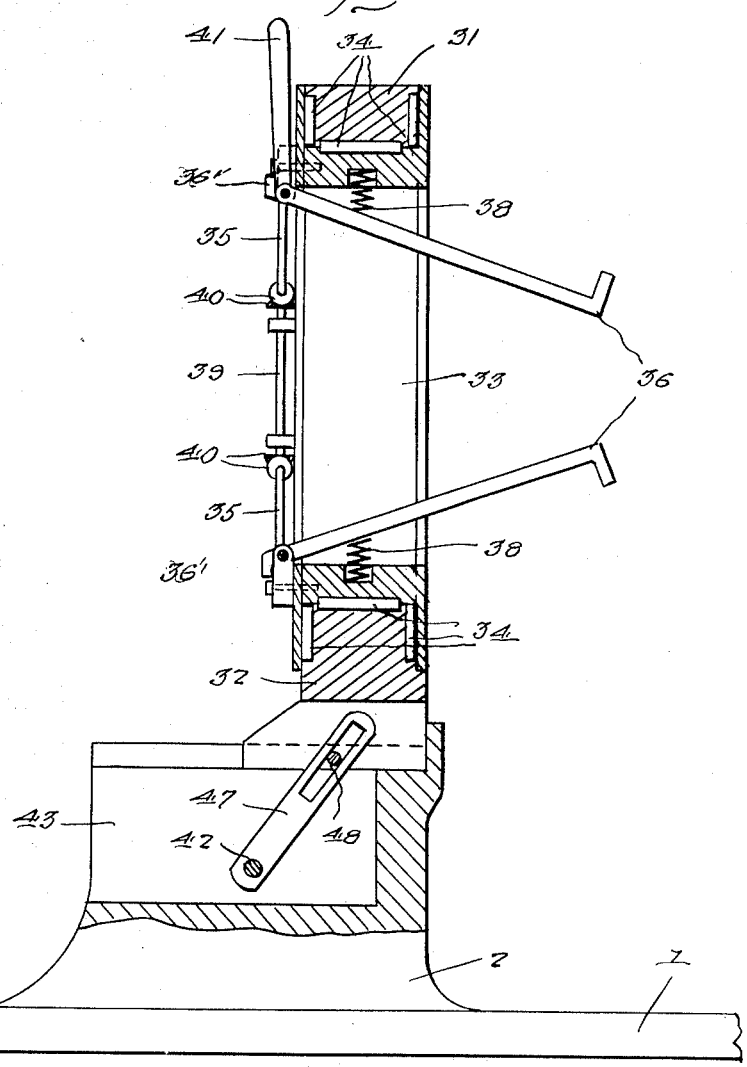
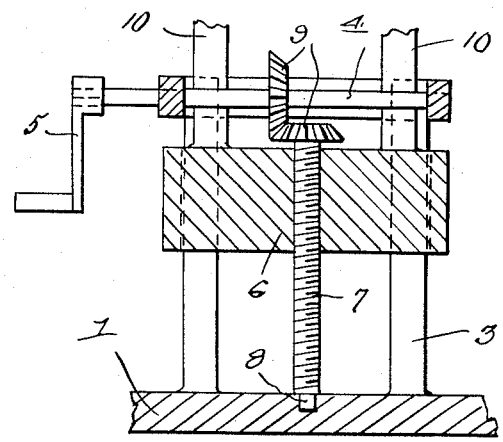
Inventor
C. E. Wood
By Clarence A. O'Brien
Attorney

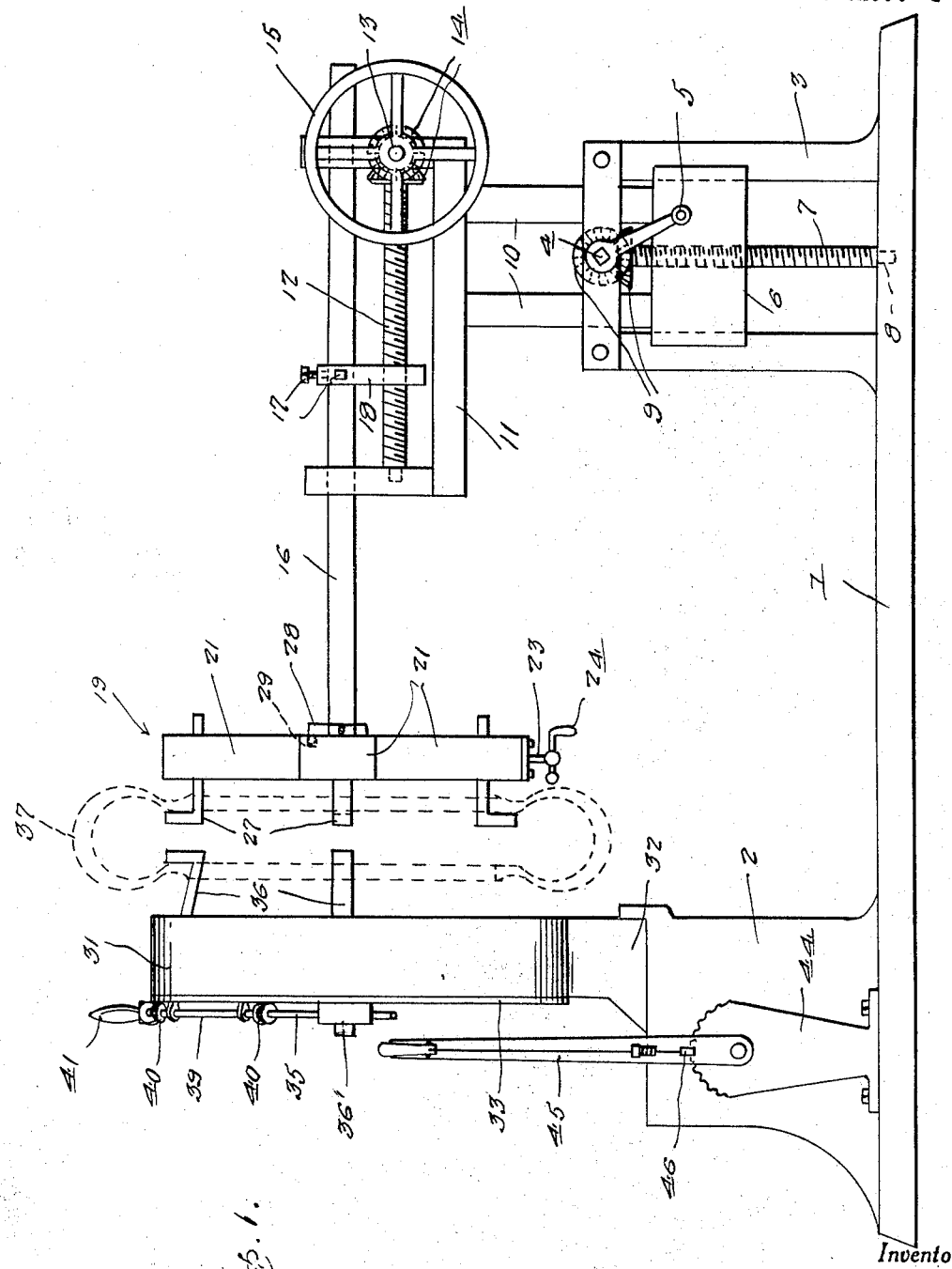

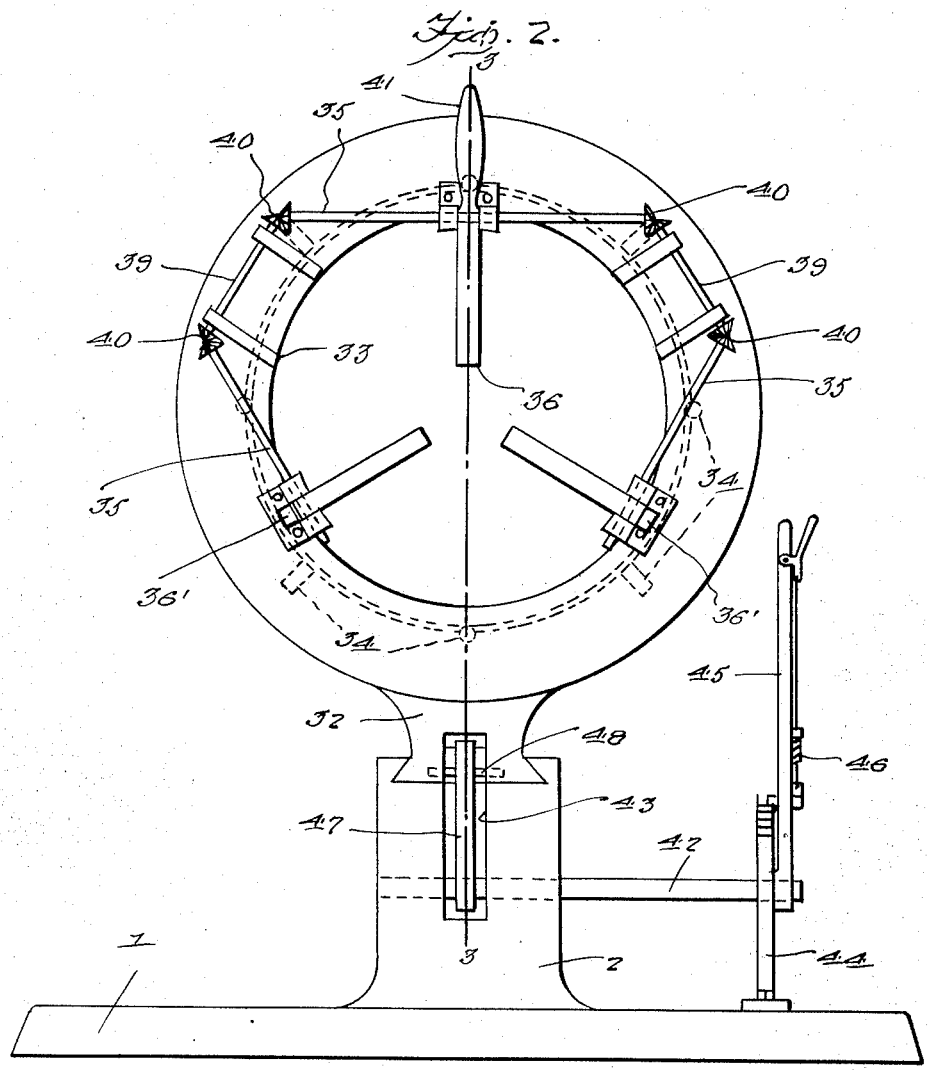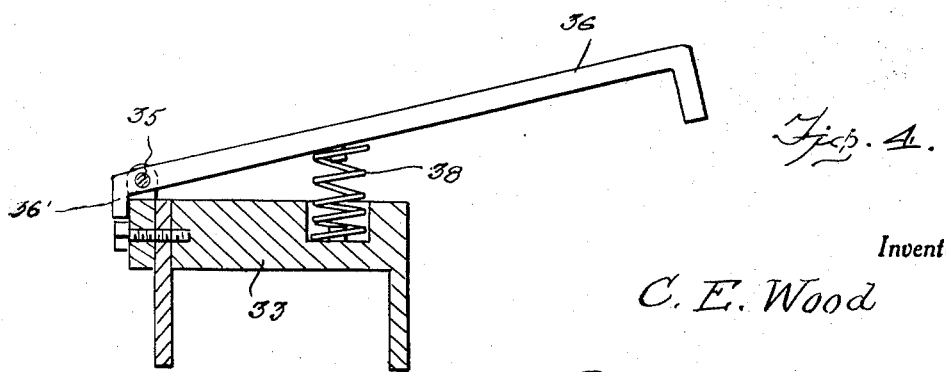

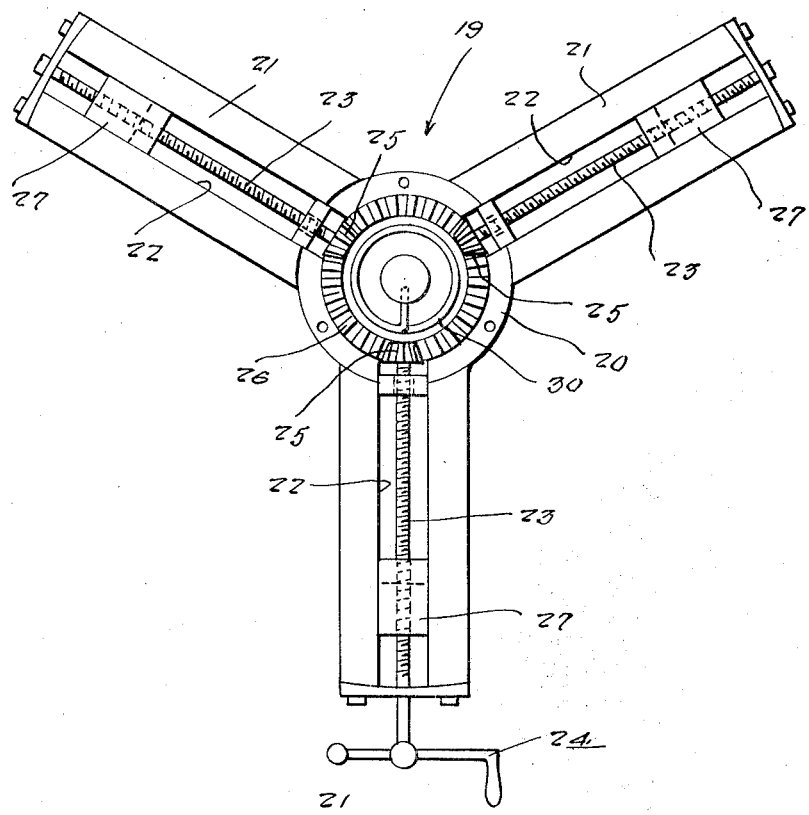
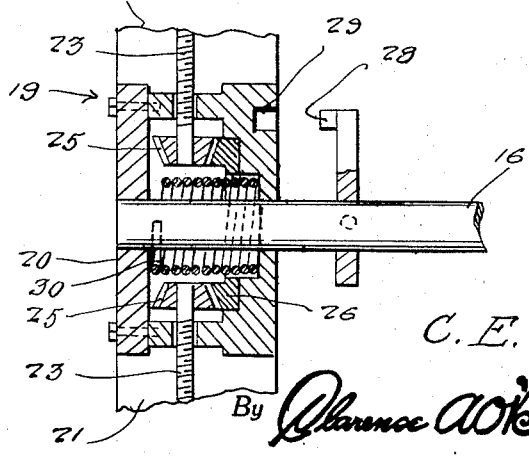

Patented Apr. 10, 1934

1,954,031

UNITED STATES PATENT OFFICE 1,954,031

TIRE SPREADER

Charles E. Wood, Highland, N. Y.

Application April 12, 1933, Serial No. 665,819

5 Claims. (Cl. 154—9)

The present invention relates to new and useful improvements in tire spreaders and has for its primary object to provide, in a manner as hereinafter set forth, a machine of this character embodying a novel construction, combination and arrangement of parts through the medium of which substantially all sizes and types of pneumatic tire casings may be expeditiously spread or expanded to permit a thorough inspection of the interior thereof.

Other objects of the invention are to provide a tire spreader which will be simple in construction, strong, durable, highly efficient and reliable in operation, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a tire spreader constructed in accordance with the present invention.

Figure 2 is a view in end elevation thereof.

Figure 3 is a view principally in vertical section through one end portion of the machine, taken substantially on the line 3—3 of Figure 2.

Figure 4 is a detail view in vertical section, showing the mounting of certain of the tire engaging hooks.

Figure 5 is a detail view in elevation of one of the tire engaging heads or units.

Figure 6 is a detail view in section through the central or hub portion of the unit shown in Figure 5.

Figure 7 is a detail view in vertical section, showing the means for manually raising or lowering the mechanism constituting one end portion of the machine.

Referring now to the drawings in detail, it will be seen that the embodiment of the present invention which has been illustrated comprises a platform 1 from one end of which a base 2 rises and upon the other end portion of which a guide 3 is provided. Journaled transversely in the upper portion of the guide 3 is a shaft 4 which is rotated through the medium of a hand crank 5. The reference numeral 6 designates a casting which is mounted for vertical reciprocation in the guide 3. Threaded through the casting 6 is a screw shaft 7 having its lower end journaled in the platform 1, as at 8. The screw shaft 7 is mounted vertically beneath the transverse shaft 4 and is operatively connected thereto for actuation thereby through the medium of beveled gears 9.

Rising from the casting 6 are uprights 10 upon which a horizontally extending frame 11 is mounted. A screw shaft 12 is journaled longitudinally in the frame 11 and said screw shaft is operatively connected to a transverse shaft 13 which is also rotatably mounted in the frame 11 through the medium of beveled gears 14. An operating wheel 15 is fixed on the shaft 13. Mounted for longitudinal sliding movement in the frame 11 in spaced parallelism with the screw shaft 12 is a shaft 16. Fixed on an intermediate portion of the slidable shaft 16 for adjustment, as by set screws 17, is an arm 18 which is threadedly connected with the screw shaft 12, thus connecting the slidable shaft 16 to said screw shaft 12 for actuation thereby.

Slidably and rotatably mounted on one end portion of the shaft 16 is a head which is designated generally by the reference numeral 19. As illustrated to advantage in Figures 5 and 6 of the drawings, the head 19 comprises a hub 20 which slidably and rotatably accommodates the shaft 16 and from which arms 21 radiate, said arms 21 having slots 22 therein in which screw shafts 23 are rotatably mounted. One of the screw shafts 23 extends beyond the outer end of its respective arm 21 and has fixed thereon a hand crank 24. Beveled gears 25 are fixed on the inner end portions of the screw shafts 23 and mesh with a ring gear 26 which is rotatably mounted in the hub 20, thus connecting all of the screw shafts 23 together for rotation in unison and for actuation by the hand crank 24. The screw shafts 23 are threadedly engaged with tire engaging hooks 27 which are mounted to travel in the slots 22 of the arms 21. It will thus be seen that, when the screw shafts 23 are rotated by the hand crank 24, the hooks 27 may be caused to move inwardly or outwardly on the arms 21.

Fixed on the shaft 16 adjacent the hub 20 is a dog 28 which is engageable selectively in sockets 29 which are provided therefor in said hub 20. A coil spring 30 encircles the shaft 16 in the hub 20 and is operatively engaged with said hub for yieldingly urging the head 19 into engagement with the dog 28.

Mounted vertically on the base 2 for sliding movement in a horizontal plane toward and away from the head 19 is a substantially circular frame 31 which includes a foot portion 32 which is dovetailed in the top of said base 2. A flanged ring 33 is rotatably mounted in the circular frame 31, suitable roller bearings 34 being provided between said ring and frame. As best seen in Figure 2 of the drawings, a plurality of shafts 35 are rotatably mounted on the outer end of the ring 33, said shafts 35 having fixed thereon tire engaging hooks 36 which extend through the ring 33 for engagement with the tire. In Figure 1 of the drawings a tire is shown in broken lines and indicated by the reference numeral 37. Coil springs 38 are mounted in sockets provided therefor in the inner periphery of the ring 33 and said coil springs are engaged with the hooks 36 for yieldingly urging said hooks inwardly or toward inoperative position. Also rotatably mounted on the outer end of the ring 33 are shafts 39 which extend between the shafts 35 and are operatively connected thereto by beveled gears 40. It will thus be seen that the shafts 34 are connected with each other for rotation in unison. A hand lever 41 is fixed on that end of one of the hooks 36 which is engaged with its respective shaft 35. It will now be seen that by operating the hand lever 41 the hooks 36 may be caused to swing inwardly or outwardly in unison. If desired, any suitable means may be provided for locking the hand lever 41 in adjusted position.

Journaled transversely in the base 2 is a shaft 42 which traverses a chamber 43 in said base 2. One end portion of the shaft 42 is journaled in a notched segment 44 which rises from the platform 1 and fixed on said one end portion of the shaft 42 is a hand lever 45. A conventional latch mechanism 46 is mounted on the hand lever 45 for engagement with the notched segment 44 for securing said hand lever in adjusted position. An arm 47 is fixed on the shaft 42 for swinging movement in the chamber 43 in the base 2 and said arm is operatively connected with the foot portion 32 of the circular frame 31 by a pin and slot connection 48, as best illustrated in Figure 2 of the drawings. As is believed to be apparent, the circular frame 31 may be moved toward or away from the head 19 by swinging the hand lever 45.

Briefly stated, one way of using the machine to inspect a tire may be as follows:—

The head 19 is moved away from the hooks 36 through the medium of the screw shaft 12 which, as previously stated, is actuated by the hand wheel 15. Also, if desired, the substantially circular frame 31 may be moved in a direction away from the head 19 by actuating the hand lever 45 in the proper direction. The hand crank 5 is then rotated in a direction to lower the head 19 to permit the hooks 27 to be engaged in the tire 37 which, if desired, may be rolled on to the platform 1 adjacent the base 2. After the hooks 27 have been engaged in the tire they may be adjusted outwardly to the desired position by actuating the hand crank 24. The hand crank 5 is then rotated in the opposite direction to raise the head 19 with the tire 37 mounted thereon and the hooks 36 are engaged in the tire. Of course, the head 19 is shifted and positioned to facilitate the engagement of the hooks 36 in the tire. Then, the screw shaft 12 is rotated in a direction to move the shaft 16 with the head 19 thereon away from the circular frame 31, thus spreading the tire. As the tire spreads the pull exerted by said tire on the head 19 progressively increases until said pull is sufficient to cause the head 19 to slide on the shaft 16, or rather to permit sliding movement of said shaft 16 in the hub 20 against the tension of the spring 30. In this way the dog 28 is disengaged from the hub 20 and the head 19 and ring 33, with the spread tire 37 mounted therebetween, may be rotated to permit the tire to be conveniently inspected from a standing position. Inner tubes may be placed in, or removed from the tire 37 through the ring 33. When comparatively small tires are to be inspected they may be mounted on the hooks 27 and 36 by simply shifting the head 19 or the substantially circular frame 31 in a horizontal plane, it being unnecessary to lower the head 19 as when mounting a comparatively large tire. Further, after comparatively small tires are engaged on the spreading hooks they may be expanded or spread by swinging the hand lever 45 in a direction to move the substantially circular frame 31 away from the head 19.

Stops 36' are provided on the hooks 36 for limiting the swinging movement of said hooks under impulsion of the springs 38. If desired, fluid actuated means may be provided for raising and lowering the frame 11 and for shifting the shaft 16.

It is believed that the many advantages of a tire spreader constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A tire spreader comprising, in combination, a platform, a vertically movable frame mounted on the platform, means for raising and lowering the frame, a horizontally slidable shaft mounted on the frame, means for actuating the shaft, and co-acting rotatable means on the shaft and the platform for engaging and spreading the tire, and for revolubly supporting the tire in either spread or normal condition, optionally.

2. A tire spreader comprising, in combination, a platform, a vertically movable frame mounted on the platform, means for raising and lowering the frame, a horizontally slidable shaft mounted on the frame, means for actuating the shaft, and co-acting means on the shaft and the platform for engaging and spreading the tire, the last named means including a rotatably mounted ring, a head rotatably and slidably mounted on the shaft, tire engaging hooks mounted on the head and the ring, and means for releasably locking the head against rotation on the shaft.

3. A tire spreader comprising a platform, a substantially circular vertical frame slidably supported on the platform, means for actuating the frame, a ring rotatably mounted in the frame, tire engaging hooks pivotally mounted on the ring, means for manually swinging the tire engaging hooks into and out of engagement with the tire, means for connecting the hooks together for operation in unison, and means shiftably mounted on the platform and engageable with the tire for co-action with the hooks for spreading said tire.

4. A tire spreader comprising a platform, a vertical guide structure mounted on the platform, a frame slidably mounted for vertical movement in the guide, means for raising and lowering the frame, a shaft mounted for horizontal sliding movement in the frame, means for actuating the shaft, a head rotatably and slidably mounted on the shaft, said head including a hub, arms radiating from the hub, said arms having slots therein, screw shafts operable in the slots, means connecting the screw shafts together for rotation in unison, means for actuating the screw shafts, tire engaging hooks slidable in the slots and threadedly engaged with the screw shafts for actuation by said screw shafts, a ring rotatably supported on the platform in spaced, opposed relation to the head, tire engaging hooks mounted on the ring, and means for releasably locking the head against rotation on the shaft.

5. A tire spreader comprising a platform, a vertical guide structure mounted on the platform, a frame slidably mounted for vertical movement in the guide, means for raising and lowering the frame, a shaft mounted for horizontal sliding movement in the frame, means for actuating the shaft, a head rotatably and slidably mounted on the shaft, said head including a hub, arms radiating from the hub, said arms having slots therein, screw shafts operable in the slots, means connecting the screw shafts together for rotation in unison, means for actuating the screw shafts, tire engaging hooks slidable in the slots and threadedly engaged with the screw shafts for actuation by said screw shafts, a ring rotatably supported on the platform in spaced, opposed relation to the head, tire engaging hooks mounted on the ring, and means for releasably locking the head against rotation on the shaft, the last named means comprising a dog fixed on the shaft and operatively engageable with the head, and a spring engaged with the head for yieldingly urging said head into engagement with the dog.

CHARLES E. WOOD.